United States Patent
Hase et al.

(10) Patent No.: US 8,749,818 B2
(45) Date of Patent: Jun. 10, 2014

(54) METHOD FOR TRANSMITTING IMAGE DATA, IMAGE PROCESSING APPARATUS, AND COMPUTER-READABLE STORAGE MEDIUM FOR COMPUTER PROGRAM

(75) Inventors: Junichi Hase, Osaka (JP); Yoichi Kawabuchi, Itami (JP); Tomonari Yoshimura, Kyoto (JP); Hiroki Tajima, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 941 days.

(21) Appl. No.: 12/634,985

(22) Filed: Dec. 10, 2009

(65) Prior Publication Data
US 2010/0149591 A1   Jun. 17, 2010

(30) Foreign Application Priority Data

Dec. 15, 2008   (JP) .................................. 2008-318826

(51) Int. Cl.
*G06F 3/12* (2006.01)
*G06F 15/16* (2006.01)

(52) U.S. Cl.
USPC ............................ 358/1.15; 358/1.1; 709/247

(58) Field of Classification Search
None
See application file for complete search history.

(56) References Cited

U.S. PATENT DOCUMENTS

| 6,189,096 | B1* | 2/2001 | Haverty | 713/155 |
| 2008/0256626 | A1* | 10/2008 | Masui | 726/20 |
| 2008/0267402 | A1* | 10/2008 | Kimura | 380/243 |

FOREIGN PATENT DOCUMENTS

| JP | 2003-224728 A | 8/2003 |
| JP | 2006-217489 | 8/2006 |

OTHER PUBLICATIONS

Notification of Reason(s) for Refusal dated Oct. 19, 2010, issued in the corresponding Japanese Patent Application No. 2008-318826, and an English Translation thereof.

* cited by examiner

*Primary Examiner* — Marcus T Riley
(74) *Attorney, Agent, or Firm* — Buchanan Ingersoll & Rooney PC

(57) ABSTRACT

A method for transmitting a plurality of pieces of image data is provided. The method includes causing an image forming apparatus (1) to perform a process of obtaining a private key (#43), a process of generating individual electronic signatures for the plurality of pieces of image data by using the private key thus obtained (#38 and #45), and a process of adding the individual electronic signatures to the plurality of pieces of image data and transmitting the plurality of pieces of image data (#49).

19 Claims, 7 Drawing Sheets

FIG. 4

```
IMAGE DATA TRANSMISSION SETTING

TRANSMISSION    [ S/MIME MAIL ]    [   NORMAL       ]
    METHOD:                        [ ELECTRONIC MAIL]

[ SIGNED FTP  ]    [ NON-SIGNATURE  ]
                                   [      FTP       ]

FORMAT:         [    TIFF     ]    [      PDF       ]

DESTINATION:    [                                   ]

[ COMPLETE ]  [ NEXT ]
```

WD1

METHOD FOR TRANSMITTING IMAGE DATA, IMAGE PROCESSING APPARATUS, AND COMPUTER-READABLE STORAGE MEDIUM FOR COMPUTER PROGRAM

This application is based on Japanese patent application No. 2008-318826 filed on Dec. 15, 2008, the contents of which are hereby incorporated by reference.

BACKGROUND OF THE INVENTION

1. Field of the Invention

The present invention relates to a method, an apparatus, and the like for transmitting a plurality of pieces of image data after adding an electronic signature thereto.

2. Description of the Related Art

Image forming apparatuses having a variety of functions, such as copying, network printing, scanning, faxing, and Transmission Control Protocol/Internet Protocol (TCP/IP) communication have recently come into widespread use. Such image forming apparatuses are sometimes called "Multi-Function Peripherals (MFPs)", "multifunction devices", or the like.

The functions of such image forming apparatuses, and peripheral technologies have recently been advanced. Thanks to the advancements, for example, image data that has been obtained by using a scanning function can be converted into image data in various formats, e.g., Tagged Image File Format (TIFF) or Portable Document Format (PDF). Such image forming apparatuses employ, as a TCP/IP application, an application for sending and receiving electronic mail and an application for sending and receiving data through FTP.

This enables a user to transmit image data that has been obtained by using the scanning function to other devices in various combinations of formats and transmission methods.

There is proposed an image forming apparatus capable of adding an electronic signature to image data in order to improve the reliability of communication (Japanese Laid-open Patent Publication No. 2003-224728).

According to the image forming apparatus described in Japanese Laid-open Patent Publication No. 2003-224728, a USB token is inserted into a USB connector of the image forming apparatus, and a document is scanned. Then, a scan data processing unit of a data processing apparatus converts an image obtained by scanning the document into a document file, and a message digest generation unit of the data processing apparatus calculates a message digest. Then, an encryption unit of the image forming apparatus uses a private key obtained from the USB token to encrypt the message digest received from the data processing apparatus. After that, a signed message digest is combined with the document file in the data processing apparatus, so that a signed document file is generated.

As discussed above, in recent years, it has come to be possible to transmit one piece of image data to other devices in various combinations of formats and transmission methods. This increases the time for a USB token to be used. In the case where a private key of a user who is logging on an image forming apparatus is read out from a certificate store of the image forming apparatus instead of from a USB token, and the private key thus read out is used, the time necessary for the user to log on the image forming apparatus is longer than before.

Meanwhile, a private key should not be leaked out. In view of this, the time for a USB token to be set to a USB connector is preferably short in order to prevent a user from failing to bring back the USB token, someone from carrying away the USB token inadvertently, or someone from stealing the USB token.

Further, it is desirable for a user to log out of an image forming apparatus promptly after transmission of image data in order to prevent someone from using or copying a private key of the user.

SUMMARY

The present disclosure is directed to solve the problems pointed out above, and therefore, an object of an embodiment of the present invention is to, in the case where a user adds an electronic signature to image data and transmits the image data, reduce the time during which a portable recording medium such as a USB token is required, or the time during which the user logs on an image processing apparatus.

According to an aspect of the present invention, a method for transmitting a plurality of pieces of image data includes causing an image processing apparatus to perform the following processes: a process of obtaining a private key, a process of generating individual electronic signatures for the plurality of pieces of image data by using the private key thus obtained, and a process of adding the individual electronic signatures to the plurality of pieces of image data and transmitting the plurality of pieces of image data, the process of adding being started after the individual electronic signatures for said plurality of pieces of image data have been generated.

According to another aspect of the present invention, a method for transmitting image data includes causing an image processing apparatus to perform the following processes: a first process of obtaining first image data, a second process of generating a plurality of pieces of second image data by converting the first image data thus obtained into the plurality of pieces of second image data in a plurality of formats, a third process of obtaining a private key, a fourth process of generating individual electronic signatures for the plurality of pieces of second image data by using the private key thus obtained, and a fifth process of adding the individual electronic signatures to the plurality of pieces of second image data and transmitting the plurality of pieces of second image data, the fifth process being started after the individual electronic signatures for said plurality of pieces of second image data have been generated.

Preferably, the first process includes obtaining the first image data by causing an image reader to read an image depicted on paper.

Preferably, the third process includes obtaining the private key from at least one of a portable recording medium and a recording medium provided in the image processing apparatus.

These and other characteristics and objects of the present invention will become more apparent by the following descriptions of preferred embodiments with reference to drawings.

BRIEF DESCRIPTION OF THE DRAWINGS

FIG. 4 is a diagram illustrating an example of an image data transmission setting screen.

DESCRIPTION OF THE PREFERRED EMBODIMENTS

Figure 1:
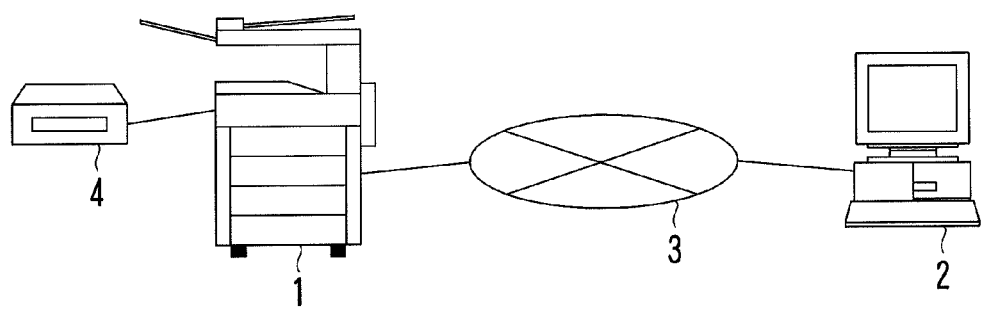
FIG. 1 is a diagram illustrating an example of the configuration of a network including an image forming apparatus.
Figure 2:
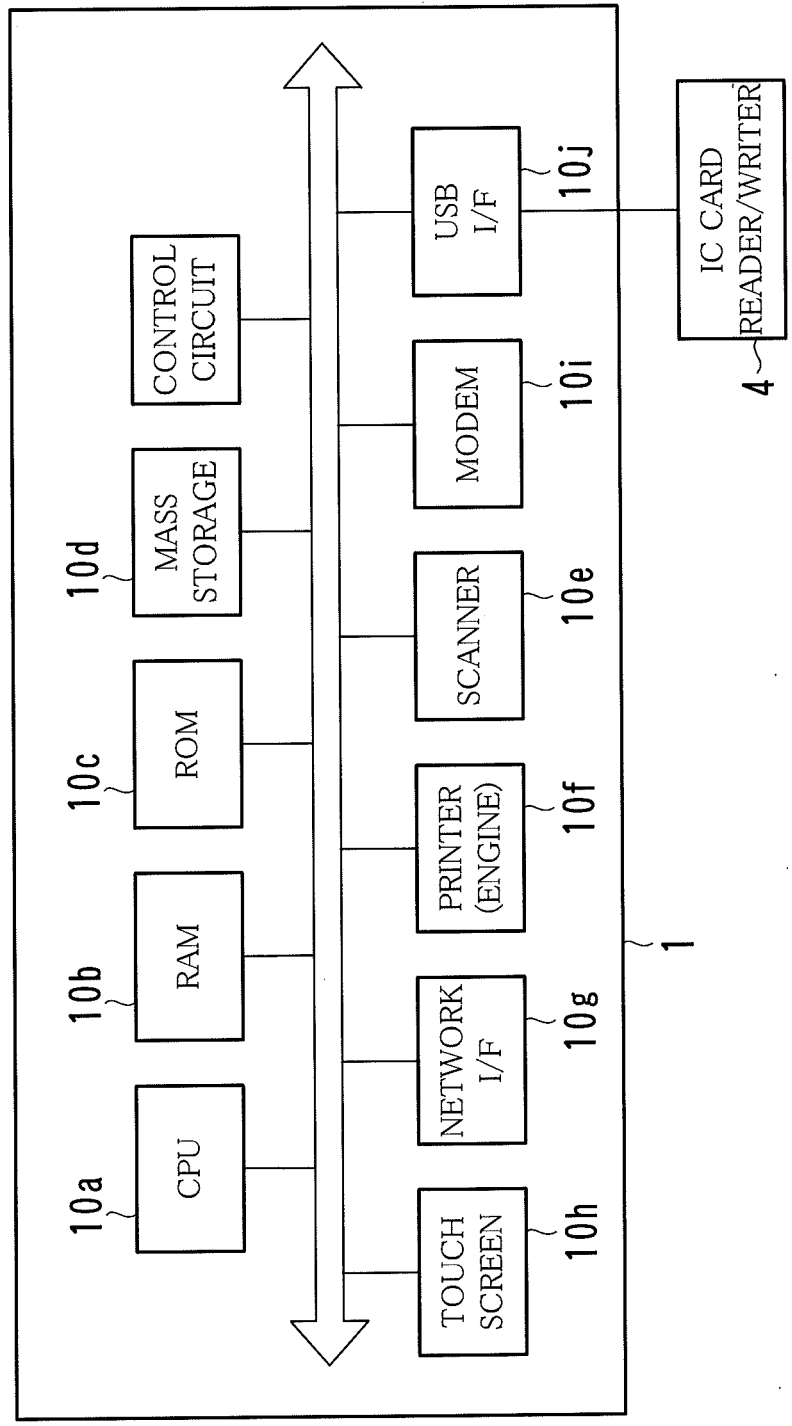
FIG. 2 is a diagram illustrating an example of the hardware configuration of an image forming apparatus.
Figure 3:
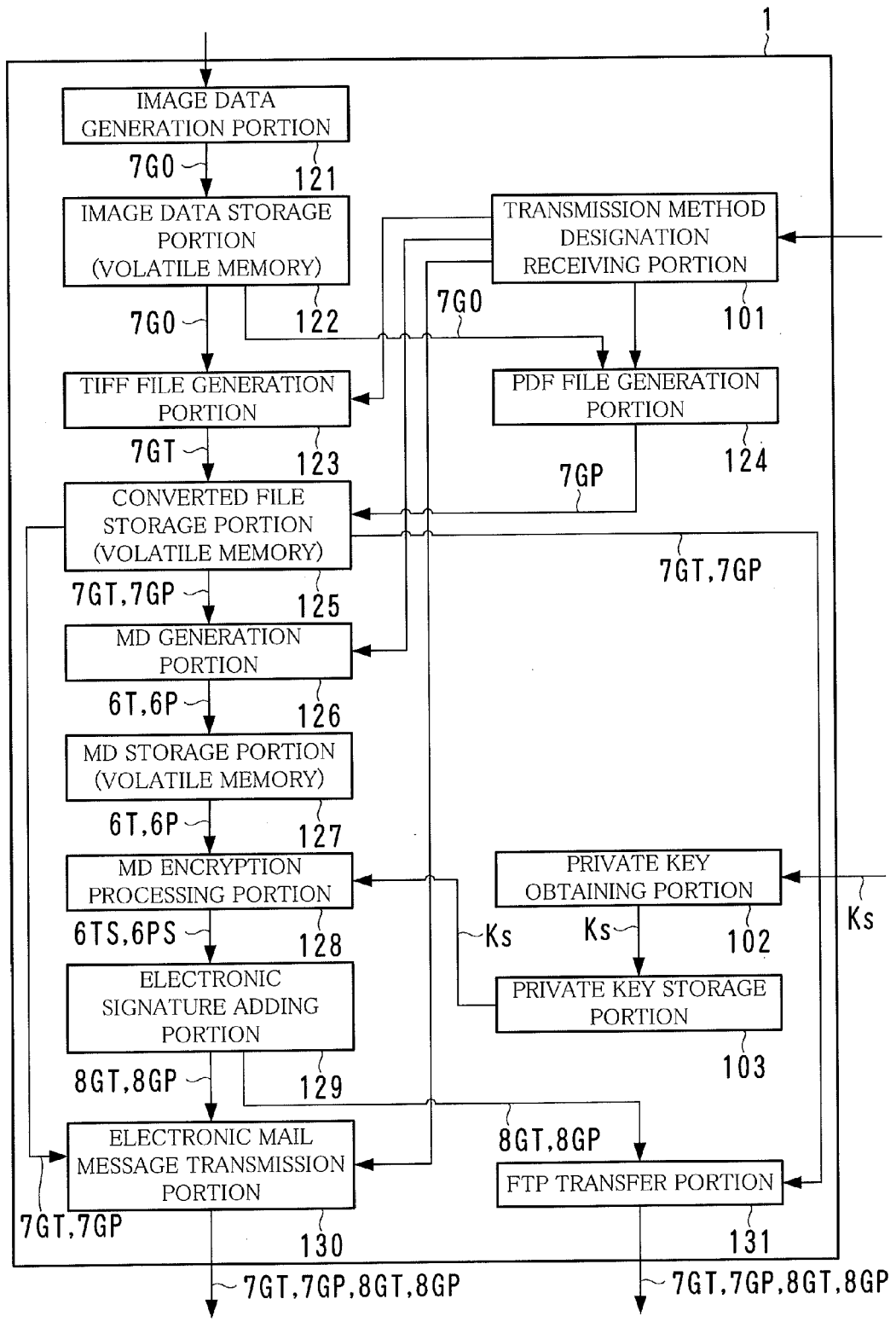
FIG. 3 is a diagram illustrating an example of the functional configuration of an image forming apparatus.

FIG. 1 is a diagram illustrating an example of the configuration of a network including an image forming apparatus 1; FIG. 2 is a diagram illustrating an example of the hardware configuration of the image forming apparatus 1; FIG. 3 is a diagram illustrating an example of the functional configuration of the image forming apparatus 1; and FIG. 4 is a diagram illustrating an example of an image data transmission setting screen WD1.

Referring to FIG. 1, the image forming apparatus 1 is configured to connect to a device such as a personal computer 2 via a communication line 3, e.g., a Local Area Network (LAN), a public line, or the Internet.

The image forming apparatus 1 is an apparatus generally called a multifunction device, a Multi-Function Peripheral (MFP), or the like. The image forming apparatus 1 is configured to integrate, thereinto, a variety of functions, such as copying, faxing, network printing, scanning, and box function.

The network printing function is a function to receive image data from the personal computer 2 and print an image onto paper. The network printing function is sometimes called a "network printer function", a "PC printing function", or the like.

The box function is a function in which storage areas called "boxes" or "personal boxes" are allocated on a user-by-user basis, and document data such as an image file and the like is saved to a users own storage area and managed therein. In short, the box function is equivalent to a file server function. The boxes herein correspond to "folders" or "directories" in a personal computer.

A user uses the image forming apparatus 1 to perform various operations of copying an image recorded on paper to another paper, generating electronic data of an image on paper, transferring such electronic data to another device, and the like.

The image forming apparatus 1 further has a function to affix an electronic signature to electronic data. A user can use the function to affix his/her electronic signature to electronic data and transfer the electronic data to another device.

Referring to FIG. 2, the image forming apparatus 1 is configured of a Central Processing Unit (CPU) 10*a*, a Random Access Memory (RAM) 10*b*, a Read-Only Memory (ROM) 10*c*, a mass storage 10*d*, a scanner 10*e*, a printer 10*f*, a network interface 10*g*, a touch screen 10*h*, a modem 10*i*, a Universal Serial Bus (USB) interface 10*j*, a control circuit, and so on.

The scanner 10*e* is a device that reads images printed on paper, such as photographs, characters, drawings, diagrams, and the like, and creates image data thereof.

The printer 10*f* serves to print, onto paper, an image obtained by scanning with the scanner 10*e* or an image included in image data received from another device.

The touch screen 10*h* displays, for example, a screen for giving a message or instructions to a user, a screen for the user to enter a process command and process conditions, and a screen displaying the result of a process performed by the CPU 10*a*. The touch screen 10*h* also detects a position thereof touched by the user with his/her finger and sends a signal indicating the result of the detection to the CPU 10*a*.

The network interface log is a Network Interface Card (NIC) for communicating with another device such as the personal computer 2 according to Transmission Control Protocol/Internet Protocol (TCP/IP) via the communication line 3.

The modem 10*i* is a device for transmitting image data via a fixed-line telephone network to another facsimile terminal and vice versa based on a protocol such as Group 3 (G3).

The USB interface 10*j* is an interface for connecting USB-compatible peripheral equipment to the image forming apparatus 1. The USB interface 10*j* is coupled to an IC card reader/writer 4 for reading out data from an IC card or writing data onto an IC card.

Referring to FIG. 3, the ROM 10*c* or the mass storage 10*d* stores programs for implementing functions of a transmission method designation receiving portion 101, a private key obtaining portion 102, a private key storage portion 103, an image data generation portion 121, an image data storage portion 122, a Tagged Image File Format (TIFF) file generation portion 123, a Portable Document Format (PDF) file generation portion 124, a converted file storage portion 125, a message digest generation portion 126, a message digest storage portion 127, a message digest encryption processing portion 128, an electronic signature adding portion 129, an electronic mail message transmission portion 130, a File Transfer Protocol (FTP) transfer portion 131, and the like. An example of the mass storage 10*d* is a hard disk or a flash memory. These programs are loaded into the RAM 10*b* as necessary, whereupon the programs are executed by the CPU 10*a*.

The whole or a part of the functions of the individual portions illustrated in FIG. 3 may be implemented merely by hardware such as a circuit.

The individual portions illustrated in FIG. 3 perform individual processes, so that an electronic signature can be added, if necessary, to one piece of image data obtained by scanning with the scanner 10*e*, and the image data can be transmitted to other devices by a plurality of transmission methods.

The following is a description of, for example, the details of processes performed by the individual portions of the image forming apparatus 1 illustrated in FIG. 3 and operation performed by a user.

A user is given in advance an IC card 5 on which a pair of a public key Kp and a private key Ks based on a Public Key Infrastructure (PKI) of the user is recorded. A Certificate Authority (CA) issues the public key Kp and the private key Ks. The IC card 5 is used as a token for the PKI as described later.

In the case where a user desires to convert an image into electronic data and transmit the electronic data to another party or another device, he/she places paper carrying the image, i.e., the original document, onto an Auto Document Feeder (ADF). Further, when desiring to transmit image data after adding an electronic signature thereto, the user inserts his/her IC card 5 into a card slot of the IC card reader/writer 4.

As described below, the transmission method designation receiving portion 101 of the image forming apparatus 1 performs a process for receiving the designation of a method for transmitting image data, an image data format, and a destination (transmission destination) of the image data.

The user enters a predetermined command into the touch screen 10*h*. Responding to this, the transmission method designation receiving portion 101 causes the touch screen 10h to display the image data transmission setting screen WD1 as illustrated in FIG. 4.

The user specifies (selects), on the image data transmission setting screen WD1, a method for transmitting image data by pressing a button corresponding to a desired method. The user presses an "S/MIME MAIL" button in order to transmit image data after attaching the image data to an electronic mail message to which an electronic signature according to Secure/Multipurpose Internet Mail Extensions (S/MIME) is added. The user presses a "NORMAL ELECTRONIC MAIL" button in order to transmit image data after attaching the image data to an electronic mail message without adding an electronic signature to the image data. The user presses a "SIGNED FTP" button in order to transmit image data through FTP after adding an electronic signature to the image data. The user presses a "NON-SIGNATURE FTP" button in order to transmit image data through FTP without adding an electronic signature to the image data.

The user also specifies (selects), on the image data transmission setting screen WD1, a format of image data to be transmitted by pressing a button corresponding to a desired format. The user presses a "TIFF" button in order to transmit TIFF image data. The user presses a "PDF" button in order to transmit PDF image data.

Further, the user specifies (enters) an address of a transmission destination (destination) of image data. In the case where the image data is to be transmitted through electronic mail, the user specifies an electronic mail address. In the case where the image data is to be transmitted through FTP, the user specifies, for example, a directory and an address of a server. Hereinafter, a set of a transmission method, a format, and a destination is collectively referred to as "transmission conditions".

When a "COMPLETE" button is pressed, the transmission method designation receiving portion 101 receives transmission conditions specified on the image data transmission setting screen WD1.

As described earlier, the user can transmit one piece of image data to a plurality of destinations in different formats and by different transmission methods. If this is the case, the user presses a "NEXT" button instead of the "COMPLETE" button after specifying a set of transmission conditions.

In response to this, the transmission method designation receiving portion 101 receives the set of transmission conditions specified on the image data transmission setting screen WD1, and after that, resets the image data transmission setting screen WD1. Then, if the user specifies another set of transmission conditions and presses the "COMPLETE" button or the "NEXT" button, then the transmission method designation receiving portion 101 receives the transmission conditions thus specified.

Referring back to FIG. 3, in the case where the user finishes specifying the transmission conditions and issues a start command by pressing a start button or the like, the private key obtaining portion 102 controls the IC card reader/writer 4 to read out a private key Ks from the IC card 5 inserted into the card slot. The private key obtaining portion 102 then obtains, from the IC card reader/writer 4, the private key Ks thus read out. The private key Ks is stored in the private key storage portion 103.

In response to the start command issued by the user, in parallel with the process by the private key obtaining portion 102 or before or after the same, the image data generation portion 121 controls the scanner 10e to read an image on the original document placed on the ADF, and generates image data 7G0 of the image thus read by the scanner 10e. The image data 7G0 is bitmap image data, that is to say, image data in the intermediate format. Since the image data in the intermediate format is primary data which has not been subjected to processing, it is generally called "RAW data". The image data 7G0 is stored in the image data storage portion 122.

The TIFF file generation portion 123 generates a TIFF image file 7GT by converting the image data 7G0 stored in the image data storage portion 122 into TIFF image data. The TIFF image file 7GT is stored in the converted file storage portion 125.

The PDF file generation portion 124 generates a PDF image file 7GP by converting the image data 7G0 stored in the image data storage portion 122 into PDF image data. The PDF image file 7GP is stored in the converted file storage portion 125.

The message digest generation portion 126 uses a hash function HF to generate individual message digests of the TIFF image file 7GT and the PDF image file 7GP stored in the converted file storage portion 125. A message digest is generally abbreviated to an "MD". Hereinafter, the individual message digests of the TIFF image file 7GT and the PDF image file 7GP are stated by respectively differentiating them as a "message digest 6T" and a "message digest 6P". The message digests 6T and 6P thus generated are stored in the message digest storage portion 127.

The message digest encryption processing portion 128 encrypts, based on the PKI, the message digests 6T and 6P stored in the message digest storage portion 127 by using the private key Ks stored in the private key storage portion 103. Hereinafter, the message digests 6T and 6P thus encrypted are respectively referred to as an "encrypted message digest 6TS" and an "encrypted message digest 6PS". As described later, each of the encrypted message digest 6TS and the encrypted message digest 6PS is used as an electronic signature.

The electronic signature adding portion 129 signs the TIFF image file 7GT stored in the converted file storage portion 125 by adding, to the TIFF image file 7GT, the encrypted message digest 6TS obtained by the message digest encryption processing portion 128. Likewise, the electronic signature adding portion 129 signs the PDF image file 7GP stored in the converted file storage portion 125 by adding, to the PDF image file 7GP, the encrypted message digest 6PS obtained by the message digest encryption processing portion 128. Hereinafter, the TIFF image file 7GT and the PDF image file 7GP to each of which an electronic signature is added are respectively referred to as a "signed TIFF image file 8GT" and a "signed PDF image file 8GP".

The electronic mail transmission portion 130 attaches, to an electronic mail message, any one of the TIFF image file 7GT, the PDF image file 7GP, the signed TIFF image file 8GT, and the signed PDF image file 8GP in accordance with the transmission conditions specified by the user, and sends the electronic mail message.

The FTP transfer portion 131 transmits, through FTP, any one of the TIFF image file 7GT, the PDF image file 7GP, the signed TIFF image file 8GT, and the signed PDF image file 8GP in accordance with the transmission conditions specified by the user.

Figure 5:
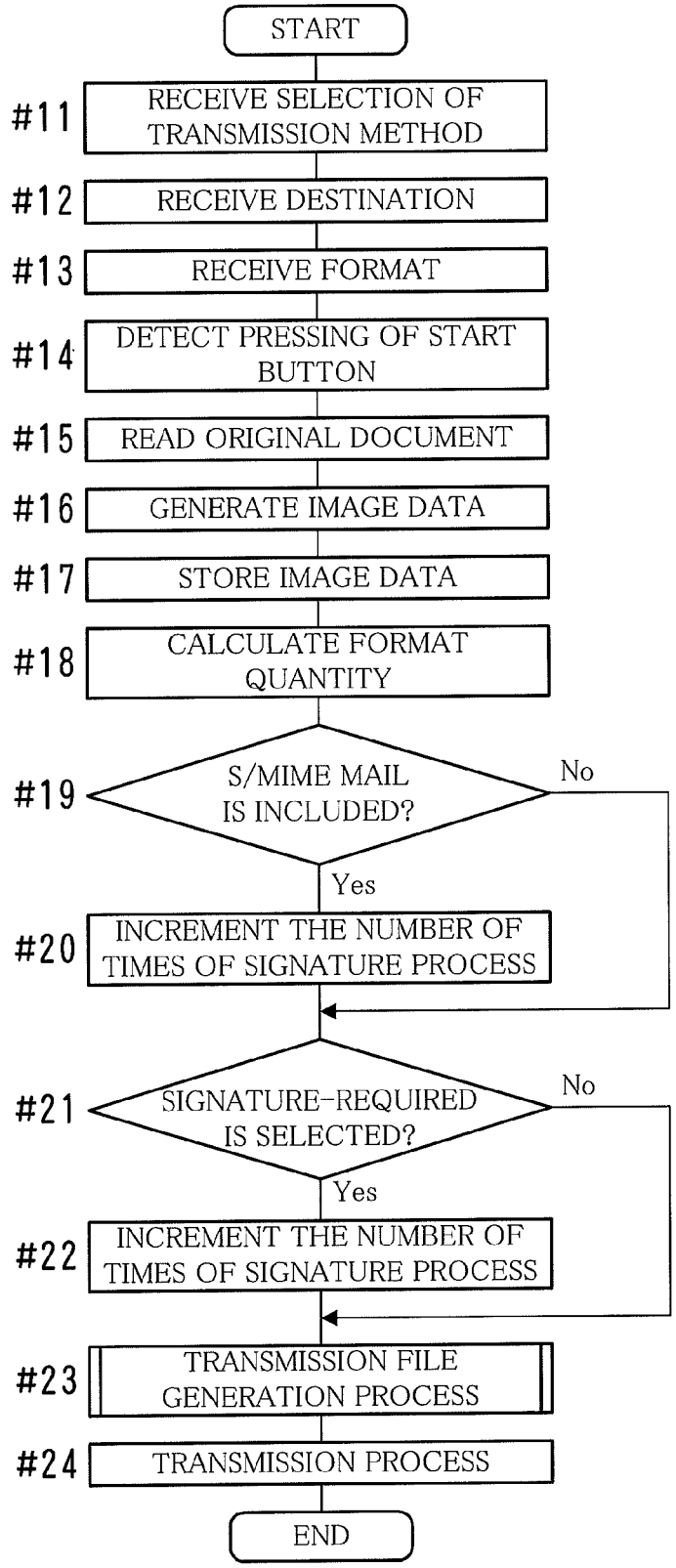
FIG. 5 is a flowchart illustrating an example of the overall processing flow of an image forming apparatus.
Figure 6:
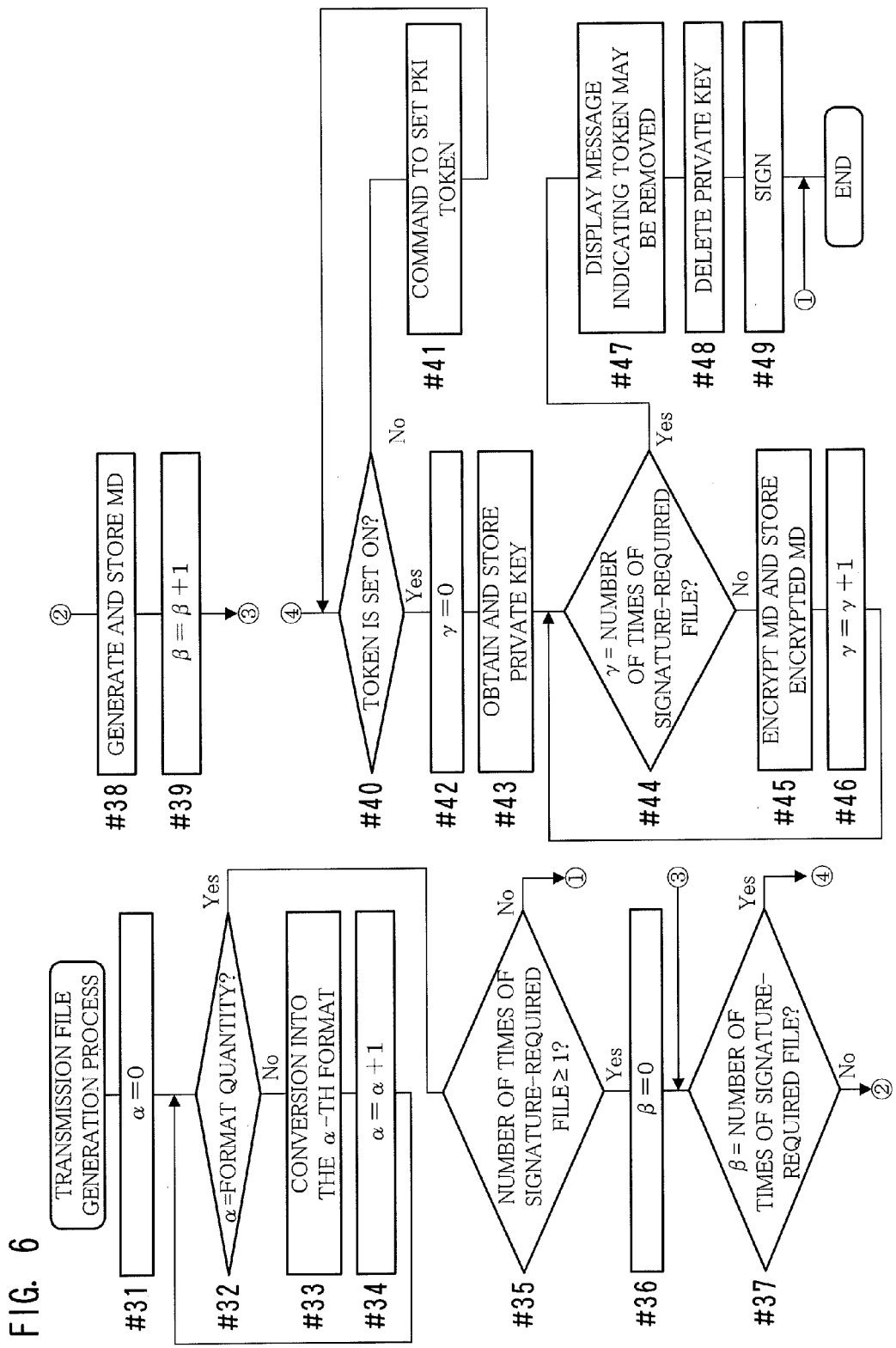
FIG. 6 is a flowchart illustrating an example of the flow of a transmission file generation process.

FIG. 5 is a flowchart illustrating an example of the overall processing flow of the image forming apparatus 1, and FIG. 6 is a flowchart illustrating an example of the flow of a transmission file generation process.

The following is a description of the overall processing flow of the image forming apparatus 1 for a case where the image forming apparatus 1 scans an image on the original document and transmits image data obtained by scanning to other devices, with reference to the flowcharts of FIGS. 5 and 6.

The image forming apparatus 1 displays the image data transmission setting screen WD1 as illustrated in FIG. 4, and waits for a user to specify transmission conditions. The user specifies, on the image data transmission setting screen WD1, one or more sets of transmission conditions. In response to this, the image forming apparatus 1 receives the individual transmission conditions thus specified (Step #11 through Step #13 of FIG. 5). The user places, on the ADF, the original document carrying an image whose data is to be transmitted. In the case where a signature is necessary, the user inserts his/her IC card 5 into the card slot of the IC card reader/writer 4. The user then presses the start button.

When detecting that the start button has been pressed (#14), the image forming apparatus 1 scans the image depicted on the original document set on the ADF to read out the image (#15). Then, the image forming apparatus 1 generates image data 7G0 and stores the image data 7G0 therein (#16 and #17).

The image forming apparatus 1 calculates how many formats are included in the transmission conditions specified by the user (#18).

If transmission through S/MIME electronic mail (S/MIME mail) is included in the transmission conditions specified by the user (Yes in #19), then the image forming apparatus 1 calculates, among image files to be transmitted through electronic mail, the number of image files to which a signature should be added (#20).

Further, if transmission through FTP of an image file to which a signature is affixed (signed FTP) is included in the transmission conditions specified by the user (Yes in #21), then the image forming apparatus 1 adds, to the calculation result obtained in Step #20, the number of image files to which a signature should be affixed among the image files to be transmitted through FTP (#22). At this time, the addition is carried out to avoid including an image file which is to be transmitted through electronic mail and to which a signature should be affixed.

The image forming apparatus 1 generates an image file to be transmitted according to the steps illustrated in the flowchart of FIG. 6 (#23).

Referring to FIG. 6, the image forming apparatus 1 converts the image data 7G0 into individual formats indicated in the transmission conditions (#31 through #34). In the case where, for example, TIFF format and PDF format are indicated in the transmission conditions, the image forming apparatus 1 generates a TIFF image file 7GT by converting the image data 7G0 into TIFF format, and generates a PDF image file 7GP by converting the image data 7G0 into PDF format.

If a signature for the TIFF image file 7GT or the PDF image file 7GP is necessary (Yes in #35), then the image forming apparatus 1 generates a message digest (message digest 6T or 6P) for the TIFF image file 7GT or the PDF image file 7GP for which a signature is necessary, and stores the message digest (#38 and #39).

The image forming apparatus 1 then obtains a private key Ks from an IC card 5 and stores the private key Ks therein (#43). After that, the image forming apparatus 1 generates an encrypted message digest 6TS and an encrypted message digest 6PS by using the private key Ks to encrypt the generated message digests 6T and 6P (#45 and #46).

If no IC card 5 is set on the IC card reader/writer 4 (No in #40), then the image forming apparatus 1 displays a message prompting the user to set an IC card 5 thereon (#41). After the completion of the encryption, the image forming apparatus 1 displays a message indicating that the IC card 5 can be removed from the IC card reader/writer 4, and deletes the private key Ks from the RAM 10b and the like (#47 and #48).

Then, the image forming apparatus 1 generates a signed TIFF image file 8GT by adding the encrypted message digest 6TS to the TIFF image file 7GT for which a signature is necessary, and generates a signed PDF image file 8GP by adding the encrypted message digest 6PS to the PDF image file 7GP for which a signature is necessary (#49).

Referring back to FIG. 5, the image forming apparatus 1 transmits, through electronic mail or FTP, any one of the TIFF image file 7GT, the PDF image file 7GP, the signed TIFF image file 8GT, and the signed PDF image file 8GP in accordance with the individual transmission conditions (#24).

To be specific, if the transmission conditions include "S/MIME MAIL" and "TIFF", then the image forming apparatus 1 attaches the signed TIFF image file 8GT to an electronic mail message, and sends the electronic mail message to an electronic mail address specified in the transmission conditions. If the transmission conditions include "S/MIME MAIL" and "PDF", then the image forming apparatus 1 attaches the signed PDF image file 8GP to an electronic mail message, and sends the electronic mail message to an electronic mail address specified in the transmission conditions.

Alternatively, if the transmission conditions include "NORMAL ELECTRONIC MAIL" and "TIFF", then the image forming apparatus 1 attaches the TIFF image file 7GT to an electronic mail message, and sends the electronic mail message to an electronic mail address specified in the transmission conditions. If the transmission conditions include "NORMAL ELECTRONIC MAIL" and "PDF", then the image forming apparatus 1 attaches the PDF image file 7GP to an electronic mail message, and sends the electronic mail message to an electronic mail address specified in the transmission conditions.

Yet alternatively, if the transmission conditions include "SIGNED FTP" and "TIFF", then the image forming apparatus 1 transmits the signed TIFF image file 8GT through FTP to a specified directory of a server corresponding to a specified address. If the transmission conditions include "SIGNED FTP" and "PDF", then the image forming apparatus 1 transmits the signed PDF image file 8GP through FTP to a specified directory of a server corresponding to a specified address.

Yet alternatively, if the transmission conditions include "NON-SIGNATURE FTP" and "TIFF", then the image forming apparatus 1 transmits the TIFF image file 7GT through FTP to a specified directory of a server corresponding to a specified address. If the transmission conditions include "NON-SIGNATURE FTP" and "PDF", then the image forming apparatus 1 transmits the PDF image file 7GP through FTP to a specified directory of a server corresponding to a specified address.

Note that it is possible to transmit the public key Kp or an electronic certificate together with the signed TIFF image file 8GT or the signed PDF image file 8GP.

In this embodiment, a process for an electronic signature is concurrently performed in advance on a plurality of pieces of image data to be transmitted. This reduces the time required until the completion of an encryption process involving a private key in comparison with the case where a series of steps for adding an electronic signature to image data and transmitting the image data is performed on image data-by-image data basis. As a result, it is possible to reduce the time during which a portable recording medium such as the IC card 5 on which the private key Ks is recorded is necessary.

Figure 7:
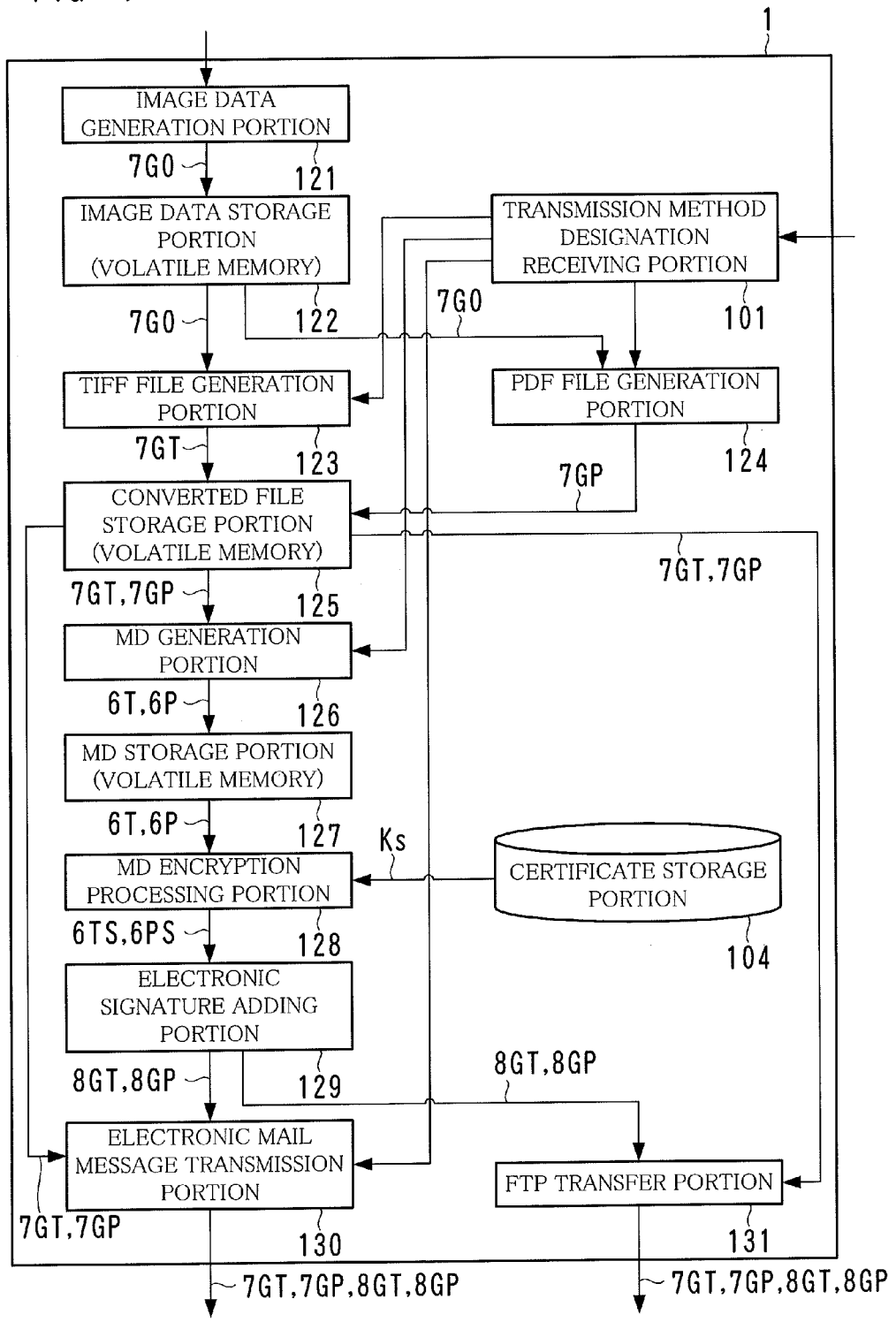
FIG. 7 is a modification of the functional configuration of an image forming apparatus.

FIG. 7 is a modification of the functional configuration of the image forming apparatus 1. In the embodiment discussed above, the private key Ks read out from the IC card 5 is used to encrypt a message digest. Instead, however, a private key Ks stored in a certificate store may be used for the encryption. In such a case, as illustrated in FIG. 7, a certificate storage portion 104, which is a certificate store, is provided in the image forming apparatus 1 instead of the private key obtaining portion 102 and the private key storage portion 103 shown in FIG. 3.

The certificate storage portion 104 stores, for each user using the image forming apparatus 1, a set of a private key Ks and an electronic certificate of the user. The private key Ks cannot be called from the certificate storage portion 104 unless a user, who is a holder of the private key Ks, logs onto the image forming apparatus 1.

The message digest encryption processing portion 128 encrypts a message digest stored in the message digest storage portion 127 by using a private key Ks that is stored in the certificate storage portion 104 and possessed by a user who is currently using (logging on) the image forming apparatus 1, instead of using a private key Ks read out from the IC card 5. Then, after the completion of all processes necessary for encryption, the image forming apparatus 1 causes the touch screen 10h to display a message indicating that the user may log out of the image forming apparatus 1 prior to a process of adding an electronic signature and onward.

The steps of the overall processing of the image forming apparatus 1 for a case in which the configuration illustrated in FIG. 7 is employed is basically the same as those described earlier with reference to FIGS. 5 and 6. However, the processes of Step #40 and Step #41 depicted in FIG. 6 are omitted in the case of the configuration shown in FIG. 7. Further, in the case of the configuration of FIG. 7, the private key Ks is obtained from the certificate storage portion 104 in Step #43 of FIG. 6.

In this embodiment, an IC card is used as a token. Instead, however, a token including a USB interface, i.e., a USB token, a smart card, or the like may be used as a token.

In the embodiment discussed above, image data obtained by scanning with the scanner is converted into various formats, and then, is transmitted. Instead, however, an image file that has already been stored in a box or the like may be converted into various formats, and then, be transmitted.

In the embodiment discussed above, image data obtained by scanning with the scanner is converted into a TIFF image file or a PDF image file. Such image data may be converted into the other formats.

In the embodiment discussed above, the overall configurations of the image forming apparatus 1, the configurations of various portions thereof, the content to be processed, the processing order, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A method for transmitting a plurality of pieces of image data by an image processing apparatus, the method comprising:

receiving, by a transmission condition receiving portion of the image processing apparatus, a plurality of transmission conditions including a first transmission condition in which a first image format is designated and a second transmission condition in which a second image format is designated;

obtaining, by an image data obtaining portion of the image processing apparatus, first image data;

converting, by an image data conversion portion of the image processing apparatus, the first image data thus obtained into second image data corresponding to the first image format, and the first image data into third image data corresponding to the second image format;

obtaining, by a private key obtaining portion of the image processing apparatus, a private key from either a portable recording medium or a recording medium provided in the image processing apparatus;

saving the obtained private key to a storage portion provided in the image processing apparatus;

generating, by an electronic signature generation portion, a first electronic signature corresponding to the second image data and a second electronic signature corresponding to the third image data by using the private key thus saved; and adding, after both the first and second electronic signatures for said second and third image data have been generated, the first and second electronic signatures to the second and third image data and transmitting the second and third image data.

2. The method according to claim 1, wherein the first process includes obtaining the first image data by causing an image reader to read an image depicted on paper.

3. An image processing apparatus comprising:

an image data obtaining portion that obtains first image data;

a transmission condition receiving portion for receiving a plurality of transmission conditions including a first transmission condition in which a first image format is designated and a second transmission condition in which a second image format is designated;

an image data conversion portion of the image processing apparatus for converting the first image data thus obtained into second image data corresponding to the first image format, and for converting the first image data into third image data corresponding to the second image format;

a private key obtaining portion that obtains a private key from either a portable recording medium or a recording medium provided in the image processing apparatus;

an electronic signature portion that generates a first electronic signature corresponding to the second image data and a second electronic signature corresponding to the third image data by using the private key thus obtained; and a transmission portion that adds, after generating both of the first and second electronic signatures for the second and third image data, the first and second electronic signatures to the second and third image data and transmits the second and third image data.

4. The image processing apparatus according to claim 3, wherein the image data obtaining portion obtains the first image data by reading an image depicted on paper.

5. A nontransitory computer-readable storage medium storing thereon a computer program used in an image processing apparatus, the computer program causing the image processing apparatus to perform the method of claim 1.

6. The nontransitory computer-readable storage medium according to claim 5, wherein the first image data is obtained by causing an image reader to read an image depicted on paper.

7. The method according to claim 1, further comprising deleting the private key saved in the storage portion, the private key deletion is started after both the first electronic signature and the second electronic signature have been generated.

8. The method according to claim 7, wherein, in the private key deletion step, the private key saved in the storage portion is deleted before both transmitting the second image data to which the first electronic signature has been added and transmitting the third image data to which the second electronic signature has been added are started in the transmission step.

9. The method according to claim 1, wherein the first transmission condition further includes a first destination and the second transmission condition further includes a second destination, and in the transmission step, the second image data to which the first electronic signature has been added is transmitted to the first destination, and the third image data to which the second electronic signature has been added is transmitted to the second destination.

10. The method according to claim 1, wherein the private key is obtained after the image data conversion step has been completed.

11. The method according to claim 1, further comprising sending a notice to prompt a user to attach the removable recording medium to the image processing apparatus, the sending of the notice being started after the conversion of the image data has been completed.

12. The method according to claim 1, wherein the image data obtaining portion obtains the first image data by causing an image reader to read out an image on paper.

13. The image processing apparatus according to claim 3, further comprising a private key storage portion for storing the private key, and the electronic signature portion generates the first electronic signature and the second electronic signature by using the private key saved in the private key storage portion.

14. The image processing apparatus according to claim 13, further comprising a private key deleting portion for deleting the private key saved in the private key storage portion after both the first electronic signature and the second electronic signature have been generated.

15. The image processing apparatus according to claim 14, wherein, in the private key deletion portion, the private key saved in the private key storage portion is deleted before both transmitting the second image data to which the first electronic signature has been added and transmitting the third image data to which the second electronic signature has been added are started in the transmission step.

16. The image processing apparatus according to claim 3, wherein the first transmission condition further includes a first destination and the second transmission condition further includes a second destination, and in the transmission step, the second image data to which the first electronic signature has been added is transmitted to the first destination, and the third image data to which the second electronic signature has been added is transmitted to the second destination.

17. The image processing apparatus according to claim 3, wherein the private key is obtained by the private key obtaining portion after the image data conversion step has been completed.

18. The image processing apparatus according to claim 3, further comprising a notice portion for sending a notice to prompt a user to attach the removable recording medium to the image processing apparatus, the sending of the notice being started after the conversion of the image data has been completed.

19. The image processing apparatus according to claim 3, wherein the image data obtaining portion obtains the first image data by causing an image reader to read out an image on paper.

\* \* \* \* \*